United States Patent
Kaplan et al.

(10) Patent No.: US 10,282,774 B2
(45) Date of Patent: May 7, 2019

(54) APPROACH FOR ORDER RESOLUTION

(71) Applicant: THE MELT, San Francisco, CA (US)

(72) Inventors: Jonathan Kaplan, San Francisco, CA (US); Jay Amando Domingo Llacuna, San Francisco, CA (US); Stanley Peter Demarta, Pleasanton, CA (US); Christopher Baldwin, San Francisco, CA (US)

(73) Assignee: FISHSIX RC, San Francisco, CA (US)

( * ) Notice: Subject to any disclaimer, the term of this patent is extended or adjusted under 35 U.S.C. 154(b) by 25 days.

(21) Appl. No.: 14/085,607

(22) Filed: Nov. 20, 2013

(65) Prior Publication Data
US 2015/0142611 A1 May 21, 2015

(51) Int. Cl.
G06Q 30/00 (2012.01)
G06Q 30/06 (2012.01)

(52) U.S. Cl.
CPC .............. *G06Q 30/0635* (2013.01)

(58) Field of Classification Search
CPC .......... G06Q 30/0601–30/0645; G06Q 30/08; G06Q 30/0635; G06Q 30/0633; G06Q 30/06; G06Q 20/20
USPC .................... 705/26.1–27.2, 26.81
See application file for complete search history.

(56) References Cited

U.S. PATENT DOCUMENTS

| | | | | |
|---|---|---|---|---|
| 7,233,914 B1* | 6/2007 | Wijaya | ............... | G06Q 10/087 705/26.1 |
| 8,069,096 B1* | 11/2011 | Ballaro | ............... | G06Q 10/087 705/27.2 |
| 2009/0228325 A1* | 9/2009 | Simmons | ......... | G06Q 10/06313 705/7.23 |
| 2014/0006182 A1* | 1/2014 | Wilson | ................. | G06Q 50/12 705/15 |
| 2014/0136366 A1* | 5/2014 | Carroll | ............... | G06Q 30/0635 705/26.8 |
| 2014/0279269 A1* | 9/2014 | Brantley | ............. | G06Q 30/0635 705/26.81 |

OTHER PUBLICATIONS

Anonymous, "Digital Dining," Beverage Industry, Oct. 2013.*

* cited by examiner

*Primary Examiner* — Brandy A Zukanovich
(74) *Attorney, Agent, or Firm* — Artegis Law Group, LLP

(57) ABSTRACT

A chain of establishments provides an online ordering system that allows a customer to order virtual items or services from an online menu. When an order is placed, the customer receives an order code that may then be verified at one of many establishment locations at one of many times to initiate order fulfillment. When the order code is verified at a particular restaurant, a point-of-service (POS) system maps the virtual items associated with the order to actual, in-stock items or services that are available at the particular establishment. The order may then be fulfilled and provided to the customer. One advantage of the disclosed technique is that the customer may pickup the order from any desired establishment location, and is not required to select a particular location when the order is placed. Consequently, the customer is provided with streamlined and flexible order placement and fulfillment experience.

23 Claims, 7 Drawing Sheets

— 308

— 310

QR Code Data
{
306 ——▶ Order Number
430 ——▶ Customer Information
440 ——▶ Virtual Items Details
}

APPROACH FOR ORDER RESOLUTION

BACKGROUND OF THE INVENTION

Field of the Invention

Embodiments of the present invention relate generally to order management systems and, more specifically, to an approach for order resolution.

Description of the Related Art

A modern business, such as a restaurant chain, oftentimes provides customers with an option to order food, merchandise or services online and then pick up the items or redeem the services from a particular establishment location. Online ordering is typically managed by a single website capable of receiving and processing orders for each establishment of the chain. Before placing the order, the customer selects the location of the particular establishment where the order should be fulfilled and the time to pick up the order. When the order is received by the website, the website passes the order along to the selected establishment location. The selected establishment receives the order, various items associated with the order are prepared or procured, services are reserved, and the order is fulfilled upon the customer's arrival at the establishment.

However, from the perspective of the customer, the above approach is inconvenient because the customer is required to select the establishment and time where and when order pickup or redemption is to occur prior to submitting the order, may need to specify a pickup/redemption time, and may not be provided an opportunity to easily adjust either the time or location of the pickup/redemption. Such a requirement precludes the customer from picking up or redeeming the order from an alternative location if such a need were to arise. For example, if the customer placed the order for pickup at a specific restaurant location, then encountered large crowds at that location or needed to travel to a different location, the customer could not simply proceed to a less crowded or different restaurant location to pick up his/her order. Such inflexibility greatly reduces the convenience of online ordering for customers. Further, the inconvenience of conventional online ordering is exacerbated when a customer attempts to order while in transit (i.e. from a mobile device). In such a situation, the customer may be unaware of which establishment location is closest to their present location or along their route, and, thus, may have difficulty selecting an establishment where pickup/redemption is to occur.

Accordingly, what is needed in the art is a more flexible approach for fulfilling orders that are placed online.

SUMMARY OF THE INVENTION

One embodiment of the present invention sets forth a computer-implemented method for processing an order placed via an online customer interface, including receiving the order at a vendor location, wherein the order includes a first virtual item, mapping the first virtual item to a first actual item that is available with respect to at least one of the vendor locations and a current time, and identifying the first actual item within an inventory associated with the vendor location to fulfill the order.

One advantage of the disclosed technique is that the customer may pickup the order from any desired establishment location and is not required to select a particular location when the order is placed. Consequently, the customer is provided with streamlined and flexible order placement and fulfillment experience.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
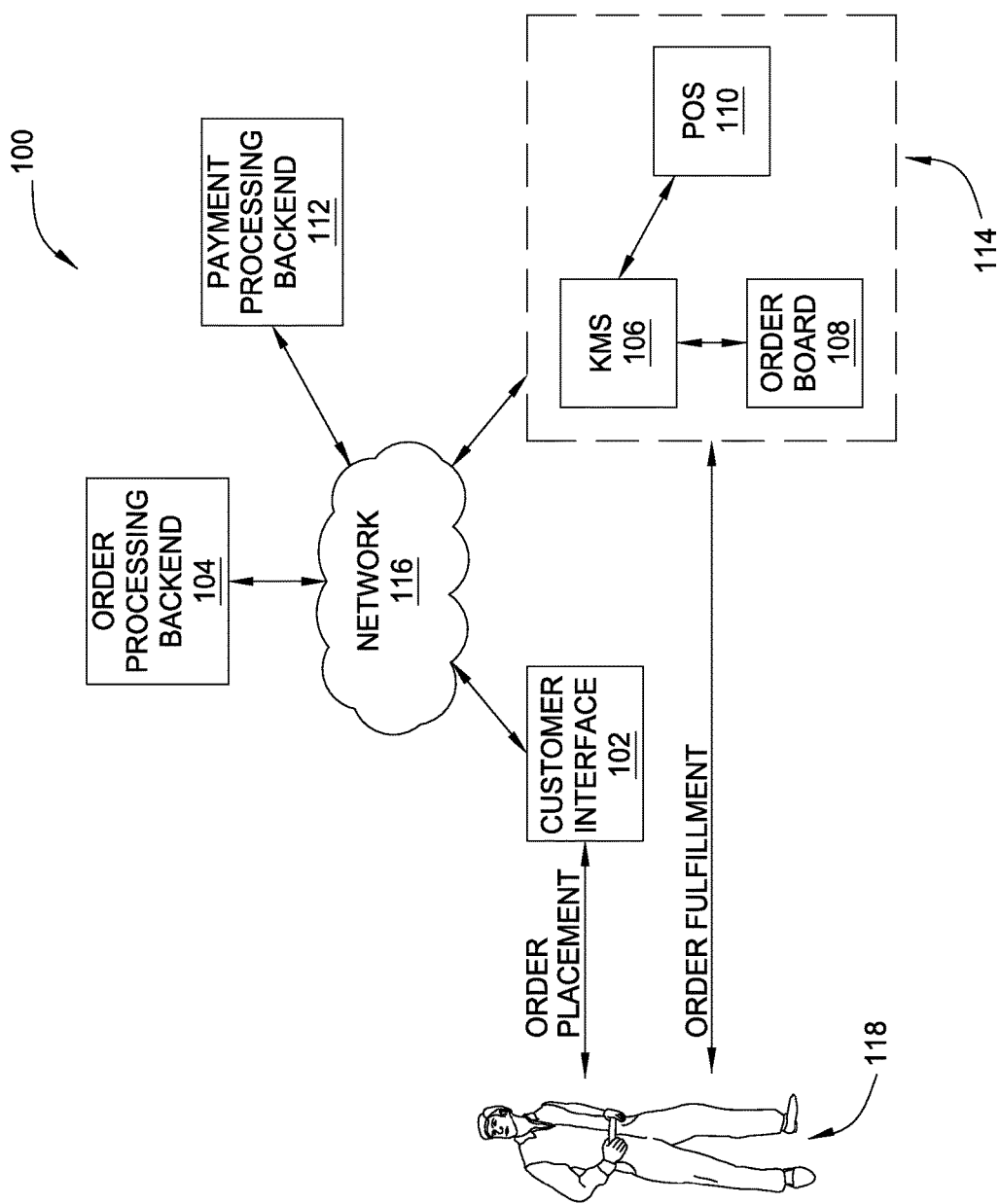
FIG. 1 is a block diagram of an order processing system configured to implement one or more aspects of the present invention.

FIG. 1 is a block diagram of an order processing system 100 configured to implement one or more aspects of the present invention. As shown, order processing system 100 includes a customer interface 102, an order processing backend 104, a kitchen management system (KMS) 106, an order board 108, a point-of-sale system (POS) 110, and a payment processing backend 112. KMS 106, order board 108, and POS 110 reside within a restaurant 114. Restaurant 114 may be a brick-and-mortar restaurant or a mobile restaurant, such as, e.g., a food truck. As a general matter, restaurant 114 may be any restaurant coupled to order processing system 100 that is configured to fulfill orders. Customer interface 102, order processing backend 104, payment processing backend 112, and restaurant 114 are coupled together by a network 116. A customer 118 may place an order with order processing system 100 by interacting with customer interface 102. The customer 118 may then visit restaurant 114, and order processing system 100 may then fulfill the order placed by the customer.

Customer interface 102 may be a website, a mobile application, an application programming interface (API), or another customer-facing user interface that allows customer 118 to view virtual items and select those virtual items for inclusion in an order. Customer interface 102 also allows customer 118 to create an online account, supply billing information, update profile details, configure preferences, and so forth. Order processing backend 104 may be a cloud-based web service or other remotely accessible system that receives, stores, and processes orders placed by customer 118 via customer interface 102. Customer interface 102 and order processing backend 104 are generally involved with order placement, as described in greater detail below in conjunction with FIG. 3.

KMS 106 includes hardware and software that allows customer 118 to initiate order fulfillment. Additionally, KMS 106 includes hardware and software that allows the crew of restaurant 114 to perform order fulfillment. For example, KMS 106 may include computer monitors that allow the crew to track order process, touch screen devices that allow the crew to input or modify order information, or databases that dynamically update inventory in response to received orders. Persons skilled in the art will recognize that any portion of KMS 106 may be implemented by a remote or cloud-based computing device. KMS 106 is coupled to, and may include, order board 108 that displays order information for customers present within restaurant 114 or querying order status associated with restaurant 114 via customer interface 102. Order board 108 may be implemented by any combination of hardware and software.

KMS 106 is also coupled to POS 110 that is configured to track the progress of orders during order processing and fulfillment. In addition, POS 110 is configured to map virtual items associated with a received order to actual items that are present within inventory associated with restaurant 114, as described in greater detail below in conjunction with FIGS. 4-5. When an order is fulfilled, POS 110 causes payment processing backend 112 to bill customer 118 for the actual items associated with the order. The trigger for payment processing may be initiated elsewhere within order processing system 100, as well. For example, order processing backend 104 may detect that an order is/has been fulfilled, and trigger payment processing. In one embodiment, payment processing backend 112 may include multiple stages of validation, including a first stage where a promotional redemption is validated, and a second stage where the customer is actually billed. The first stage could occur within restaurant 114, while the second stage could occur elsewhere. Other combinations of payment processing stages also fall within the scope of the present invention. Persons skilled in the art will recognize that any portion of POS 110 may be implemented by a remote or cloud-based computing device.

KMS 106, order board 108, and POS 110 are generally involved with order fulfillment, as described in greater detail below in conjunction with FIG. 3.

Customer interface 102, order processing backend 104, KMS 106, order board 108, POS 110, and order processing backend 112 may each be implemented by a computing device or network of computing devices. An exemplary computing device is described below in conjunction with FIG. 2.

Figure 2:
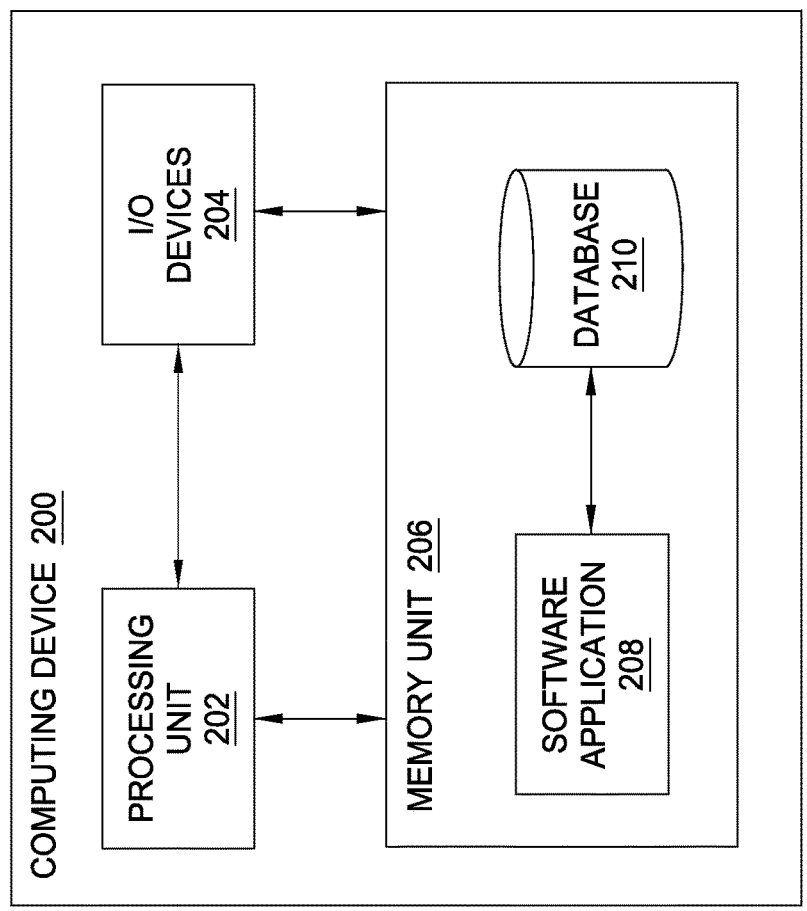
FIG. 2 is an exemplary computer system that resides within the order processing system of FIG. 1, according to one embodiment of the present invention.

FIG. 2 is an exemplary computing device 200 that resides within order processing system 100 of FIG. 1, according to one embodiment of the present invention. Computing device 200 may be a physical or a virtual computing device, or a combination of the two. As shown, computing device 200 includes a processing unit 202, input/output devices 204, and a memory unit 206, coupled to one another. Memory unit 206 includes an application 208 that is coupled to a database 210. Processing unit 202 may be a central processing unit (CPU), application specific integrated circuit, (ASIC), or any other data processing element. I/O devices 204 may include devices capable of receiving input, devices capable of generating output, and devices capable of both receiving input and generating output. Memory unit 206 may include any type of memory module or a collection of memory modules capable of storing data. Software application 208, upon execution by processing unit 202, performs the overall functionality of computing device 202. In doing so, software application 208 may store and/or retrieve data from database 210.

As mentioned, computing device 200 may implement any of customer interface 102, order processing backend 104, KMS 106, order board 108, POS 110, or payment processing backend 112 shown in FIG. 1. For example, if computing device 200 implements customer interface 102, then software application 208 could be a web server application that processes web requests to support the operation of a customer-facing website. In doing so, software application 208 could validate orders placed by customer 118 and perform other functionality associated with customer interface 102. Database 210 could store customer profile information, billing information, preferences, and so forth. In another example, if computing device 200 implements order processing backend 104, then software application 208 could parse orders received from customer interface 102 and store information associated with each such order within database 210.

Persons skilled in the art will recognize that computing device 200 represents just one exemplary implementation of a component within order processing system 100, and that other implementations also fall within the scope of the present invention. As a general matter, computing device 200 may be any technically feasible type of device configured to implement any of the functionality described here.

As mentioned above in conjunction with FIG. 1, customer interface 102 and order processing backend 104 are generally involved with order placement. As also mentioned, KMS 106, order board 108, POS 110 and payment processing backend 112 are generally involved with order fulfillment. Order placement and order fulfillment are described in greater detail below in conjunction with FIG. 3.

Figure 3A:
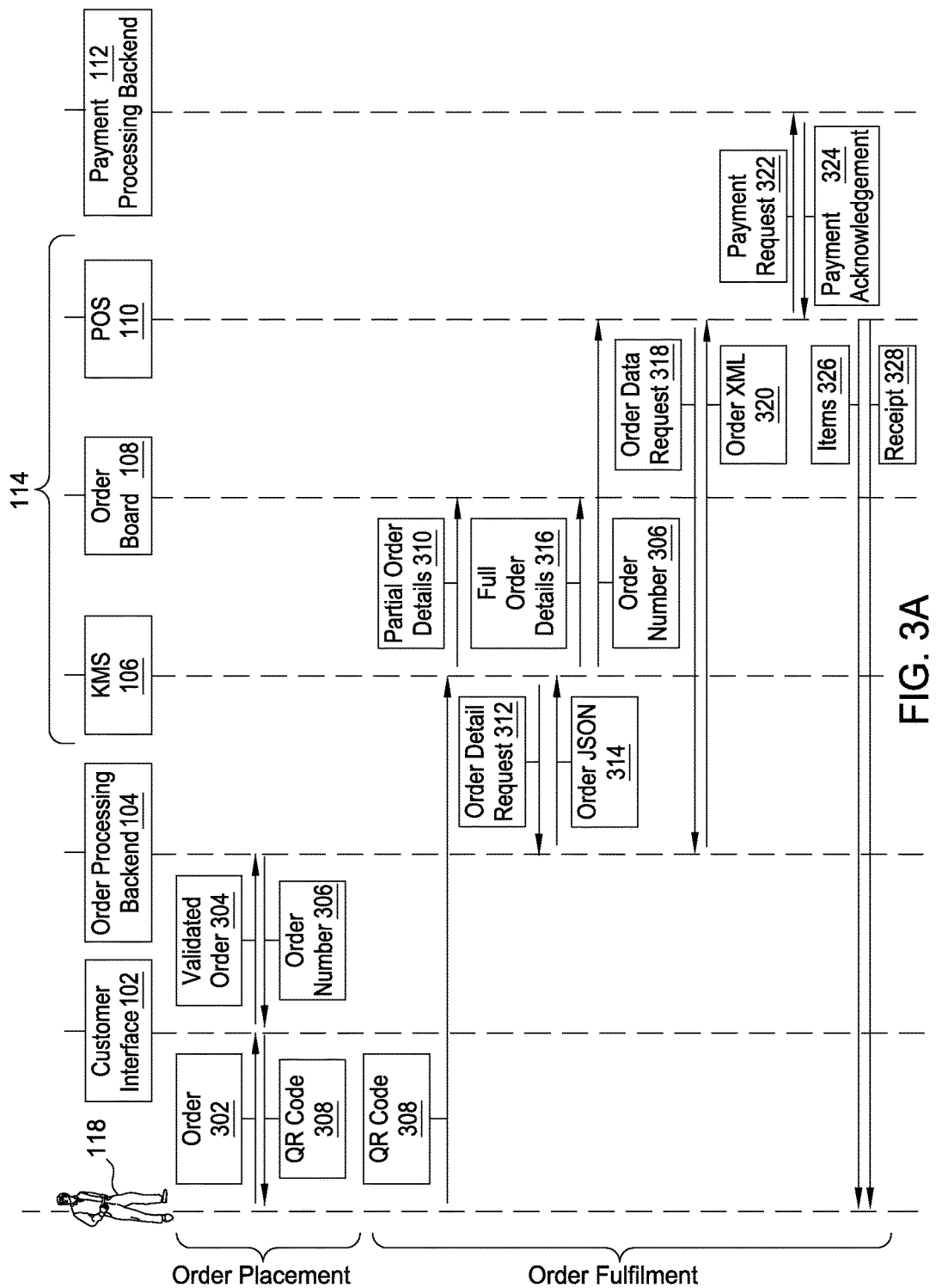
FIG. 3A is a data flow diagram illustrating data that is exchanged when the order processing system of FIG. 1 processes an order, according to one embodiment of the present invention.

FIG. 3A is a data flow diagram illustrating data that is exchanged when the order processing system of FIG. 1 processes an order, according to one embodiment of the present invention. As shown, customer 118 places an order 302 via customer interface 102. Order 302 includes virtual items that customer 118 selects from a menu provided by customer interface 102. The virtual items within order 302 may or may not correspond to actual items that are available at restaurant 114, depending on the current inventory of that restaurant, among other possibilities. Those virtual items may also represent generic categories of items that can be mapped, at a later time, to specific items present in the inventory of restaurant 114 at a particular time.

Figure 4:
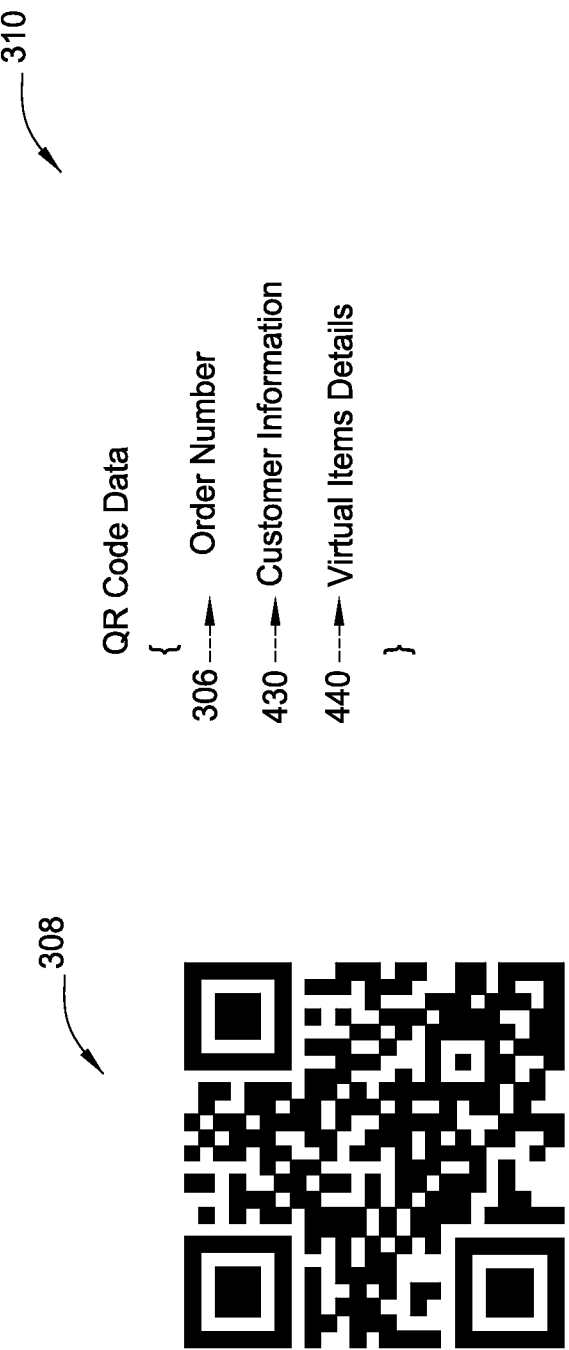
FIG. 4 is a conceptual diagram illustrating order data that is encoded within a quick response (QR) code, according to one embodiment of the present invention.

Customer interface 102 validates order 302 and then transmits a validated order 304 to order processing backend 104. Order processing backend 304 stores validated order 304 within a database and assigns an order number 306 to that order. Order processing backend 104 may also perform additional validation steps. Order processing backend 104 then transmits order number 306 to customer interface 102. In response, customer interface 102 generates a QR code 308 that includes information associated with the order. QR code 308 may include a partial description of the order, a customer number that identifies customer 118, the name of the customer, and other information. QR code 308 may also be encrypted. FIG. 4, described in greater detail below, illustrates QR code 308 along with data that may be encoded within that QR code. Customer interface 102 is configured to provide QR code 308 to customer 118, thereby completing order placement.

To initiate order fulfillment, customer 118 visits restaurant 114 (or any other restaurant coupled to order processing system 100) and scans QR code 308 via a QR code scanner. KMS 106 generally includes one or more QR code scanners that are accessible to customers who are present within restaurant 114. KMS 106 decrypts QR code 308 and extracts partial order details 310 from QR code 308. Partial order details 310 generally reflect a simplified representation of the virtual items associated with order 302. Partial order details 310 could, for example, include a description of the category of virtual item, such as "sandwich," "beverage," etc., and may also include the first and last name of customer 118. However, partial order details 310 could, in fact, include order details having any level of specificity, including complete order details, as well as a category or generalization associated with the order. Partial order details 310 are described in greater detail below in conjunction with FIG. 4. KMS 106 is configured to populate order board 108 with partial order details 310.

KMS 310 also transmits order details request 312 to order processing backend 104. In response, order processing backend 104 provides a JavaScript object notation (JSON) object to KMS 106, shown as order JSON 314. Order JSON 314 is a structured dataset that includes a more complete description of the virtual items associated with order 302. Order JSON 314 could specify, for example, the particular type of sandwich ordered, or the particular type of beverage ordered. Order JSON 314 may also be implemented by any type of structured dataset apart from JSON, as persons skilled in the art will readily recognize. Upon receipt of order JSON 314, KMS 106 parses full order details 316 from order JSON 314 and updates order board 108 to reflect those details. In certain implementations, KMS 106 may first update order board 108 with partial order details 310 prior to acquiring complete order details 316 in order to hide latency associated with acquiring full order details 316. KMS 310 is also configured to extract order number 306 from QR code 308 and to provide order number 306 to POS 110.

POS 110 receives order number 306 and then transmits order data request 318 to order processing backend 104. In response, order processing backend 104 provides an extensible markup language (XML) file to POS 110, shown as order XML 320. Order XML 320 includes information that is needed to fulfill order 302. For example, order XML 320 may include full order details (similar to full order details 316), as well as billing information associated with customer 118, promotional information, and/or modifications to the virtual items within order 302 (such as, e.g. "extra cheese"). Order XML 320 may be implemented by any type of serialized representation of data, beyond XML.

POS 110 places order XML 320 into an order queue. When order XML 320 progresses to a certain position within that queue, POS 110 may then map the virtual items within order XML 320 to actual items currently present in the inventory of restaurant 114. As previously mentioned, the virtual items within order 302 and order XML 320 represent generic items that may or may not be available at restaurant 114.

POS 110 is configured to perform several different types of mapping processes when different possible scenarios occur. In a first scenario, POS 110 may determine that an actual item directly corresponding to the virtual item is present within the inventory of restaurant 114. POS 110 then maps that virtual item to the actual item. In a second scenario, POS 110 may determine that the virtual item represents a general category of item. POS 110 then maps that category to a specific instance of the category that is available within the inventory of restaurant 114. That specific instance could vary depending on the type of restaurant 114. For example, POS 110 could map a "soda" category to a "fountain soda" item in the case of a brick-and-mortar type restaurant, or to a "can of soda" item in the case of a food truck type restaurant. The specific instance could also vary depending on the time at which the order is redeemed. For example, restaurant 114 could offer coffee brewed in a large pot before noon, yet only offer individual serving coffee after noon. When an order that includes a cup of coffee is redeemed, POS 110 could map the virtual "coffee" item differently depending on the current time.

In a third scenario, POS 110 could determine that a particular virtual item is simply unavailable, and then map the virtual item to a different, alternative actual item. In this scenario, POS 110 may attempt to map the virtual item to a relatively similar actual item. For example, POS 110 could map a virtual "soda" item (that is not available) to a "water" item. This mapping process is described in greater detail below in conjunction with FIGS. 5 and 6

Figure 5:
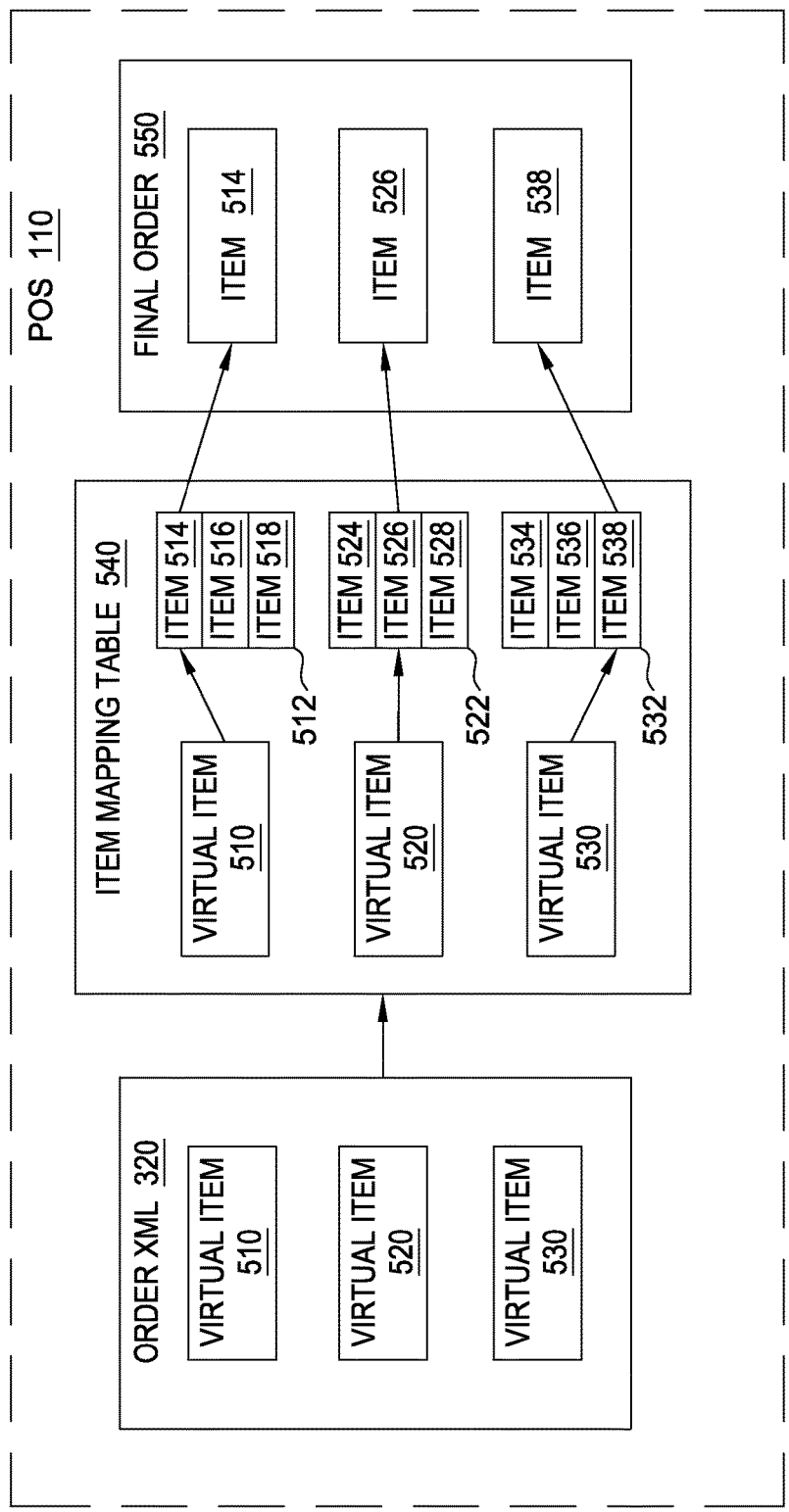
FIG. 5 is a conceptual diagram illustrating an item mapping table that maps virtual items in an online order to actual items in a final order, according to one embodiment of the present invention.

POS 110 implements the aforementioned mapping process to resolve the virtual items within order XML 320 to actual items that are present within the inventory of restaurant 114 at the current time via an item mapping table. The item mapping table allows POS 110 to map the virtual items within order XML 320 to actual items. POS 110 adds those actual items to a final order (not shown here), and then processes the final order. FIG. 5, described below in greater detail, illustrates an exemplary item mapping table.

When processing the final order, POS 110 may interact with KMS 106 to notify the crew of restaurant 114 that certain items should be prepared. POS 110 computes the total cost of the order (based on the final version of the order), retrieves billing information for customer 118 from order XML 320, and causes payment processing backend 112 to bill the customer 118 for the order. POS 110 receives a payment acknowledgement 324 from payment processing backend, and then items 326 associated with the original order 302 may be provided to customer 118. POS 110 also generates a receipt 328 that may be physically printed and provided to customer 118 or emailed to the customer.

Figure 3B:
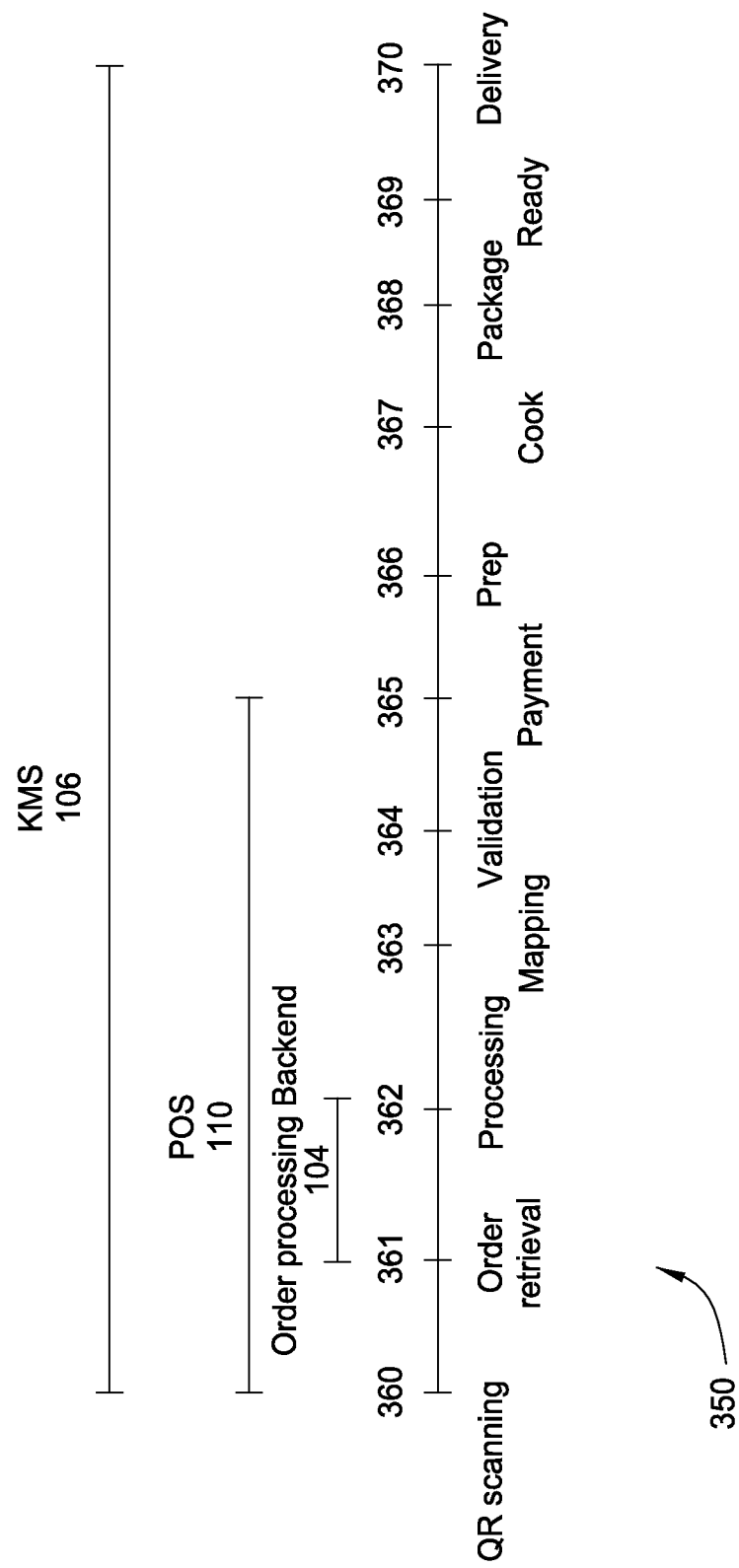
FIG. 3B is a conceptual diagram illustrating the lifecycle of an order when the order processing system of FIG. 1 processes an order, according to one embodiment of the present invention.

FIG. 3B is a conceptual diagram illustrating a lifecycle 350 of order 306 when the order processing system of FIG. 1 processes an order, according to one embodiment of the present invention. FIG. 3B also illustrates the specific elements of order processing system 100 that are involved with each different stage in that lifecycle 350. As shown, lifecycle 350 includes a plurality of stages, including scanning 360, order retrieval 361, processing 362, mapping 363, validation 364, payment 365, prep 366, cook 367, package 368, ready 369, and delivery 370. The span of a given element, such as KMS 106, POS 110, or ordering processing backend 104, as shown in FIG. 3B, indicates the involvement of each such element in the stages within that span.

FIG. 4 is a conceptual diagram illustrating order data that is encoded within a quick response (QR) code, according to one embodiment of the present invention. As shown, QR code 308 includes various black and white regions that may be sized and arranged to encode partial order details 310. As mentioned above, partial order details 310 generally reflect a simplified representation of the virtual items associated with order 302, and may also include other order-related information as well as customer information.

As shown, partial order details 310 include order number 306, customer information 430, and virtual item details 440. As discussed, when customer 118 scans QR code 308 at KMS 106, KMS 106 may decrypt QR code 308 and extract partial order details 310. KMS 106 may then populate order board 108 with portions of partial order details 310, including virtual item details 440 and customer information 430. In this fashion, customer 118 may be notified that order 302 was received very shortly after QR code 310 is scanned.

FIG. 5 is a conceptual diagram illustrating an item mapping table 540 that maps virtual items in an XML order 320 to actual items in a final order 550, according to one embodiment of the present invention. As shown, XML order 320 includes virtual items 510, 520, and 530. Virtual items 510, 520, and 530 represent selections from an online menu provided by customer interface 102. Actual versions of those items may or may not be available at restaurant 114, depending on the current inventory of that restaurant. Virtual items 510, 520, and 530 may also represent generic categories of items. POS 110 maps virtual items 510, 520, 530 to specific, available items using item mapping table 540.

Item mapping table 540 includes entries for each possible virtual item, including virtual items 510, 520 and 530, as is shown. Each virtual item 510, 520, and 530 is associated with a different hierarchy of actual items. Virtual item 510 is associated with hierarchy 512, virtual item 520 is associated with hierarchy 522, and virtual item 530 is associated with hierarchy 532. Each such hierarchy includes different alternative items that represent the corresponding virtual item. Hierarchy 512 includes items 514, 516, and 518 that represent virtual item 510, hierarchy 522 includes items 524, 526, and 528 that represent virtual item 520, and hierarchy 532 includes items 534, 536 and 538 that represent virtual item 530.

When POS 110 receives XML order 320, as discussed above in conjunction with FIG. 3, POS 110 maps the virtual items in that order to actual items available at restaurant 114. Again, POS 110 may perform different types of mappings when three potential scenarios occur. In the first scenario, POS 110 maps a virtual item to a corresponding actual item that is present within inventory of restaurant 114. In the second scenario, POS 110 maps a category-type virtual item to an actual item, where that actual item represents a specific instance of the category that is available within the inventory of restaurant 114. In the third scenario, POS 110 maps the virtual item to a different, alternative actual item (e.g. when the virtual item cannot be directly mapped to an actual item due to the actual item being out of stock).

In the example shown in FIG. 5, POS 110 maps virtual item 510 to item 514, virtual item 520 to item 526, and virtual item 530 to item 538. Items 514, 526, and 538 represent actual items that are available at restaurant 114. POS 110 includes these items within final order 550, along with specific prices for these items, and then fulfills final order 550 in the fashion described above in conjunction with FIG. 3.

Item mapping table 540 may fluctuate over time depending on the inventory of restaurant 114 and depending on the current time. For example, mapping table 540 could include a drip coffee option in the morning, when coffee has been brewed, while offering a single-serving coffee (e.g., k-Cup®, etc.) option in the afternoon. In addition, item mapping table 540 may vary between different restaurants associated with order processing system 100. For example, a brick-and-mortar restaurant could include an item mapping table that maps a "beverage" virtual item to a fountain drink item, while a food truck restaurant could include an item mapping table that maps the "beverage" virtual item to a can of soda.

Item mapping table 540 may also specify mappings that are not 1:1. For example, if a soda is not available, item mapping table 540 could map a soda virtual item to a water and to a cookie. In another embodiment, item mapping table 540 may specify a 1:1 or a 1:N mapping depending on location (N being an integer). For example, at a restaurant, item mapping table 540 could map a virtual coffee item to a coffee, but at a food truck, item mapping table 540 could map the virtual coffee item to a coffee and to a disposable or reusable cup. With this approach, item mapping table 540 is configured to track inventory items for one type of restaurant that are not relevant to other types of restaurants, and to support different, relevant mapping operations for those different types of restaurants.

The item mapping table for a food truck restaurant may also vary based on location of the food truck. For example, when the food truck resides at a first location, the item mapping table may quote specific prices for each item, while quoting different prices for the same items when the food truck resides at a second location. The prices within the item mapping table could also vary depending on whether the food truck resides at a particular event. For example, the item mapping table could include one set of prices when the food truck is parked at an event location and an event is in progress. However, when the event is not in progress, the item mapping table could include a different set of prices. As a general matter, item mapping table 540 may include different entries and different prices for those entries based on a wide variety of different factors.

The approach described thus far effectively separates the order placement process from the order fulfillment process described in conjunction with FIG. 3. Consequently, customer 118 is not required to determine, in advance, which restaurant location should fulfill order 302. Thus, customer 118 is free to select the restaurant of their choosing (e.g. restaurant 114) at the time when customer 118 wishes to pickup that order. Since each restaurant is capable of mapping virtual items within an order placed online to a final order that may be fulfilled, any restaurant coupled to order processing system 100 is capable of fulfilling an order at any time. In one embodiment, a given restaurant may perform a different mapping depending on the time at which the mapping is performed. The mapping technique described above by way of example is described in stepwise fashion below in conjunction with FIG. 6.

Figure 6:
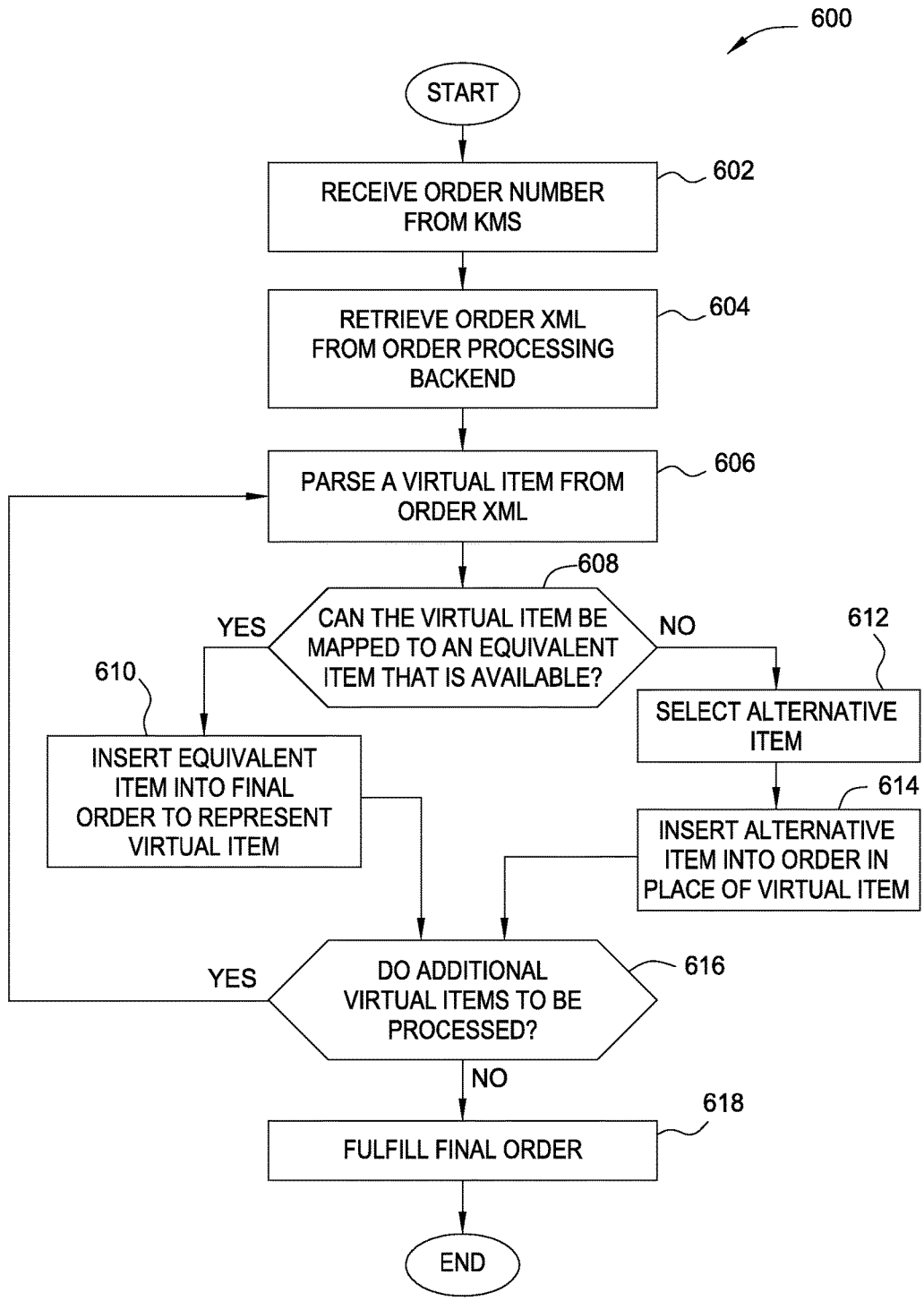
FIG. 6 is a flow diagram of method steps for mapping virtual items in an online order to actual items in a final order, according to one embodiment of the present invention.

FIG. 6 is a flow diagram of method steps for mapping virtual items in an online order to actual items in a final order, according to one embodiment of the present invention. Although the method steps are described in conjunction with the systems of FIGS. 1-5, persons skilled in the art will understand that any system configured to perform the method steps, in any order, is within the scope of the present invention.

As shown, a method 600 begins at step 602, where POS 110 receives order number 306 from KMS 106. At step 604, POS 110 retrieves order XML 320 from order processing backend 104 by issuing order data request 318. At step 606, POS 110 parses a virtual item from order XML 320. The virtual item could be, e.g., virtual item 510, 520, or 530 of FIG. 5.

At step 608, POS 110 determines whether the virtual item can be mapped to an equivalent item that is available within the inventory of restaurant 114. As discussed, the virtual items within a given order represent generic items that are shown within a menu presented by customer interface 102. Those virtual items may correspond to actual items that may, or may not, be available at restaurant 114. Those virtual items may also represent item categories that can be mapped to specific items. If POS 110 determines that the virtual item may be mapped to an equivalent item that is currently available, then POS 110 proceeds to step 610.

At step 610, POS 110 inserts the equivalent, in-stock item into a final order that replaces the original order 302. POS 110 could, for example, extract the in-stock item by inspecting item mapping table 540 and retrieving a top item in a hierarchy of alternative items associated with the virtual item. At step 616, POS 110 determines whether additional virtual items remain within order XML 320. If additional virtual items need to be mapped, then the POS 110 returns to step 608. Otherwise, POS 110 proceeds to step 618 and fulfills the final order.

At step 608, If POS 110 determines that the virtual item cannot be mapped to an equivalent item that is currently available, then POS 110 proceeds to step 612. At step 612, POS 110 implements item mapping table 540 to select an alternative item to include within the final order in place of the virtual item. POS 110 may analyze a hierarchy of alternative items, and then identify an in-stock item that is most similar to the virtual item. At step 614, POS 110 inserts the alternative item into the order in place of the virtual item. POS 110 then continues to step 616, and proceeds as described above.

By implementing the method 600, POS 110 is capable of resolving virtual item associated with an online menu to actual items that are present within inventory associated with a given restaurant location. Accordingly, the virtual item selections shown in the online menu need not accurately reflect the inventory of each individual restaurant where an online order may be fulfilled. Thus, the customer is not required to select a particular restaurant where the order should be fulfilled at the time of order submission. When the customer desires the order to be fulfilled, the customer selects a particular restaurant location and initiates order fulfillment in the fashion described above. The selected restaurant then resolves the virtual items within the online order to actual, in-stock items.

In practice, the customer is not charged for the order until pickup. This feature provides flexibility in enabling the functionality described previously. Prices may vary between location, time of day, event status, local inventory, seasonality of products/services, and substitutions, so in an embodiment the customer is not charged until these factors are taken into consideration. The flexible nature of the invention described herein enables a customer to place and fulfill an order regardless of these variations.

As discussed herein, the invention may enable a customer to have flexibility in both the location and time that an order is fulfilled. The various elements of the invention may be employed individually or in combination to provide different degrees in this flexibility. For example, a system may allow for variations in the pickup/redemption location of an order, but only within a pre-defined window or time. This may be used by businesses that experience peak and off-peak hours or days. Similarly, a system may allow for variations in the pickup/redemption time/day, but be restricted to a specific location (or type of location). This may be used by businesses that have inventory restrictions at certain locations (like food trucks), and if certain items are ordered the customer may only be able to redeem the order at locations that commonly carry those items.

In one embodiment of the invention, some of the variability experienced by a business may be reduced by using analytics related to available customer data. For example, it would be helpful if a restaurant could use information from online orders to assist in managing staffing levels, inventory management, promotions, etc. If customers are provided with flexibility in when and/or where they pickup/redeem their order, this information may not be directly obtained from the order. A business may be able to deduce certain information from an order, from additional profile information provided by a customer, and from past orders/redemptions by the same customer. For example, if an order is placed by a customer within a certain period of time before a prime eating time (such as within an hour before 9 am, 12 pm, 6 pm), this may indicate that the customer is likely to visit the closest establishment location to their current position. The customer's current position may be determined based on profile information (such as where they live or work), determining the location of their IP address, or via location data provided from a mobile phone. Location data provided by a mobile phone may be provided from an app running on the mobile device with permission and access to GPS or other positioning systems supported on the mobile device, via cellular or wireless access point data associated with the device, etc.

Alternately, the data may indicate that the customer will visit one of a number of locations within a certain distance of their current position. The customer may develop patterns with respect to any of when they place and order, their location when placing an order, the method that they use for placing an order (mobile app, website, etc), their preferred pickup/redemption location(s) and/or time of pickup/redemption. As information regarding the customer and the order are accessible within the system when an order is picked up/redeemed, a statistical profile of a specific customer may be developed. This statistical profile, alone or in aggregated in combination with other customer profiles, may enable a business to better manage their resources, promotions, etc. Further, in an embodiment of the invention, a business may target advertising and/or promotions to a customer based on their location (at the time of ordering, or at a later time/place when their location data can be provided to the business or service acting on behalf of the business), proximity to an establishment location, the time/day, and/or profile information. For example, if a business is provided access to a customer's social network, it may be possible to determine that the customer is likely to be at a specific upcoming event. The business may then provide the customer with a promotion related to the event. If the customer places an order related to the promotion, they may choose to redeem the order at the event. However, in an embodiment of the invention the customer may choose to place an order associated with an event, but redeem the actual order at another time/location. The invention described herein provides multiple opportunities and flexibility for businesses and/or customers to customize their relationship to each other.

By decoupling the ordering placement process from the order fulfillment process, the order processing system described in the context of the present invention provides customers with a highly flexible online ordering experience. In addition, the system described thus far requires simpler infrastructure to implement. In particular, the system described herein does not require a customer-facing website to aggregate inventory information across all possible establishment locations and then dynamically create a different online menu or inventory for each such location based on the associated inventory or product offerings, as required by prior art approaches.

In sum, a chain of establishments provides an online ordering system that allows a customer to order virtual items or services from an online menu. When an order is placed, the customer receives an order code that may then be verified at any establishment location to initiate order fulfillment. When the order code is verified at a particular restaurant, a point-of-service (POS) system maps the virtual items associated with the order to actual, in-stock items or services that are available at the particular establishment. The order may then be fulfilled and provided to the customer.

One advantage of the disclosed technique is that the customer may pickup the order from any desired establishment location, and is not required to select a particular location when the order is placed. Consequently, the customer is provided with streamlined and flexible order placement and fulfillment experience.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. In particular, the techniques described herein may be applicable to a wide variety of business outside of those discussed herein, including, for example, big box retail locations, boutique stores, concert, theater, movie or other entertainment venues, spas or beauty salons, and so forth.

Therefore, the scope of embodiments of the present invention is set forth in the claims that follow.

The invention claimed is:

1. A computer-implemented method for automatically processing an order placed via an online customer interface, the method comprising:
   receiving a quick response (QR) code that includes a partial description of a first online order that is redeemable at any one of a plurality of vendor locations, wherein the QR code comprises a computer-readable code that includes encrypted information associated with a first representation of a first virtual item included in the first online order;
   decrypting the QR code, via a kitchen management system at a first vendor location, to extract an order number that identifies the first online order;
   transmitting the order number to a point-of-sale system included in the kitchen management system;
   transmitting an order data request based on the order number to an order processing backend via the point-of-sale system;
   receiving a complete description of the first online order from the order processing backend, wherein the complete description of the first online order comprises a data structure that includes a second representation of the first virtual item representing a customer selection;
   identifying a first actual item for fulfilling the first online order by mapping, via the point-of-sale system, the first virtual item to the first actual item based on an item mapping table, wherein the first actual item is available with respect to at least one of the first vendor location and a current time;
   in response to identifying the first actual item based on the item mapping table, identifying, via the point-of-sale system, the first actual item within an inventory database included in the kitchen management system to fulfill the first online order; and
   in response to identifying the first actual item based on the item mapping table, processing the first online order via the point-of-sale system.

2. The computer-implemented method of claim 1, wherein mapping the first virtual item to the first actual item comprises determining that an equivalent item corresponding to the first virtual item is available at the first vendor location.

3. The computer-implemented method of claim 1, wherein mapping the first virtual item to the first actual item comprises:
   identifying a first category that is represented by the first virtual item; and
   determining that the first actual item represents a specific instance of the first category that is associated with the first vendor location.

4. The computer-implemented method of claim 1, wherein mapping the first virtual item to the first actual item comprises:
   determining that an equivalent item corresponding to the first virtual item is not available at the first vendor location; and
   selecting a first alternative item from a set of alternative items associated with the first virtual item to replace the first actual item.

5. The computer-implemented method of claim 1, wherein receiving the complete description of the first online order at the vendor comprises:
   receiving a scan of the quick response (QR) code;
   extracting the order number from the QR code; and
   retrieving the complete description of the first online order from the order processing backend based on the order number.

6. The computer-implemented method of claim 5, further comprising issuing the QR code to the customer when the first online order is placed via the online customer interface.

7. The computer-implemented method of claim 1, further comprising:

computing a cost associated with the first online order based on a price associated with the first actual item; and causing a payment processing backend to charge an account associated with the customer based on the cost associated with the first online order.

8. The computer-implemented method of claim 7, further comprising determining the price associated with the first actual item based on the first vendor location.

9. The computer-implemented method of claim 7, further comprising determining the price associated with the first actual item based on the first vendor location participating in an event.

10. The computer-implemented method of claim 1, wherein the item mapping table indicates a mapping between the first virtual item and at least two actual items in the inventory database, and wherein the at least two actual items collectively represent an alternative to the first actual item.

11. The computer-implemented method of claim 1, wherein the item mapping table includes a hierarchy of actual items that is associated with the first virtual item and includes the first actual item, and wherein mapping the first virtual item to the first actual item comprises selecting the first actual item from within the hierarchy of actual items.

12. A system for automatically processing an order placed via an online customer interface, including:
a kitchen management system at a first vendor location that:
receives a quick response (QR) code that includes a partial description of a first online order that is redeemable at any one of a plurality of vendor locations, wherein the QR code comprises a computer-readable code that includes encrypted information associated with a first representation of a first virtual item included in the first online order;
decrypts the QR code to extract an order number that identifies the first online order;
transmits the order number to a point-of-sale system included in the kitchen management system;
the point-of-sale system located at the first vendor location that:
transmits an order data request based on the order number to an order processing backend via the point-of-sale system;
receives, via the order processing backend, a complete description of the first online order at the first vendor location, wherein the complete description of the first online order comprises an extensible markup language file that includes a second representation of the first virtual item representing a customer selection;
identifies a first actual item for fulfilling the first online order by mapping the first virtual item to the first actual item based on an item mapping table, wherein the first actual item is available with respect to at least one of the first vendor location and a current time;
in response to identifying the first actual item based on the item mapping table, identifies the first actual item within an inventory database to fulfill the first online order; and
in response to identifying the first actual item via the item mapping table, processes the first online order.

13. The system of claim 12, wherein the point-of-sale system maps the first virtual item to the first actual item by determining that an equivalent item corresponding to the first virtual item is available at the first vendor location.

14. The system of claim 12, wherein the point-of-sale system maps the first virtual item to the first actual item by:
identifying a first category that is represented by the first virtual item; and
determining that the first actual item represents a specific instance of the first category that is associated with the first vendor location.

15. The system of claim 12, wherein the point-of-sale system maps the first virtual item to the first actual item by:
determining that an equivalent item corresponding to the first virtual item is not available at the first vendor location; and
selecting a first alternative item from a set of alternative items associated with the first virtual item to replace the first actual item.

16. The system of claim 12, wherein the kitchen management system receives the complete description of the first online order at the first vendor location by:
receiving a scan of the QR code;
extracting an order number from the QR code; and
retrieving the complete description of the first online order from the order processing backend based on the order number.

17. The system of claim 16, further including the online customer interface, wherein the customer interface issues the QR code to the customer when the first online order is placed.

18. The system of claim 12, wherein the point-of-sale system:
computes a cost associated with the first online order based on a price associated with the first actual item; and
causes a payment processing backend to charge an account associated with the customer based on the cost associated with the first online order.

19. The system of claim 18, wherein the point-of-sale system determines the price associated with the first actual item based on the first vendor location.

20. The system of claim 18 wherein the point-of-sale system determines the price associated with the first actual item based on the first vendor location participating in an event.

21. A non-transitory computer-readable medium storing program instructions that, when executed by a processing unit, cause the processing unit to automatically process an order placed via an online customer interface by performing the steps of:
receiving a quick response (QR) code that includes a partial description of a first online order that is redeemable at any one of a plurality of vendor locations, wherein the QR code comprises a computer-readable code that includes encrypted information associated with a first representation of a first virtual item included in the first online order;
decrypting the QR code, via a kitchen management system at a first vendor location, to extract an order number that identifies the first online order;
transmitting the order number to a point-of-sale system included in the kitchen management system;
transmitting an order data request based on the order number to an order processing backend via the point-of-sale system;
receiving a complete description of the first online order from the order processing backend, wherein the complete description of the first online order comprises a data structure that includes a second representation of the first virtual item representing a customer selection;

identifying a first actual item for fulfilling the first online order by mapping, via the point-of-sale system, the first virtual item to the first actual item based on an item mapping table, wherein the first actual item is available with respect to at least one of the first vendor location and a current time;

in response to identifying the first actual item based on the item mapping table, identifying, via the point-of-sale system, the first actual item within an inventory database included in the kitchen management system to fulfill the first online order; and in response to identifying the first actual item based on the item mapping table, processing the first online order via the point-of-sale system.

22. The non-transitory computer-readable medium of claim 21, further comprising the steps of:

computing a cost associated with the first online order based on a price associated with the first actual item; and causing a payment processing backend to charge an account associated with the customer based on the cost associated with the first online order.

23. The non-transitory computer-readable medium of claim 21, wherein neither the QR code nor the partial description of the first online order contains any information specifying the first vendor location.

* * * * *